June 27, 1961 I. M. LEVY ET AL 2,990,112
VENTILATING MEANS
Filed May 28, 1959 3 Sheets-Sheet 1

INVENTORS
Irving M. Levy
Jack W. Savage
BY Raymond A. Flora

John T. Marvin
Their Attorney

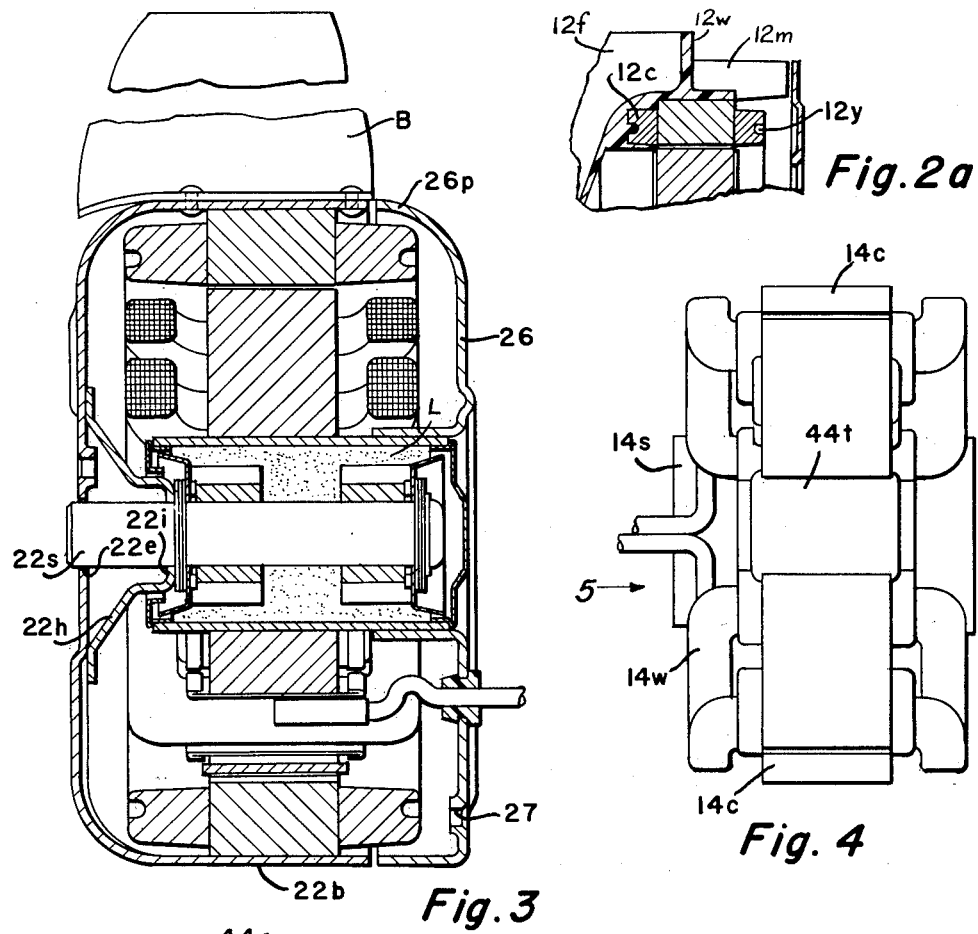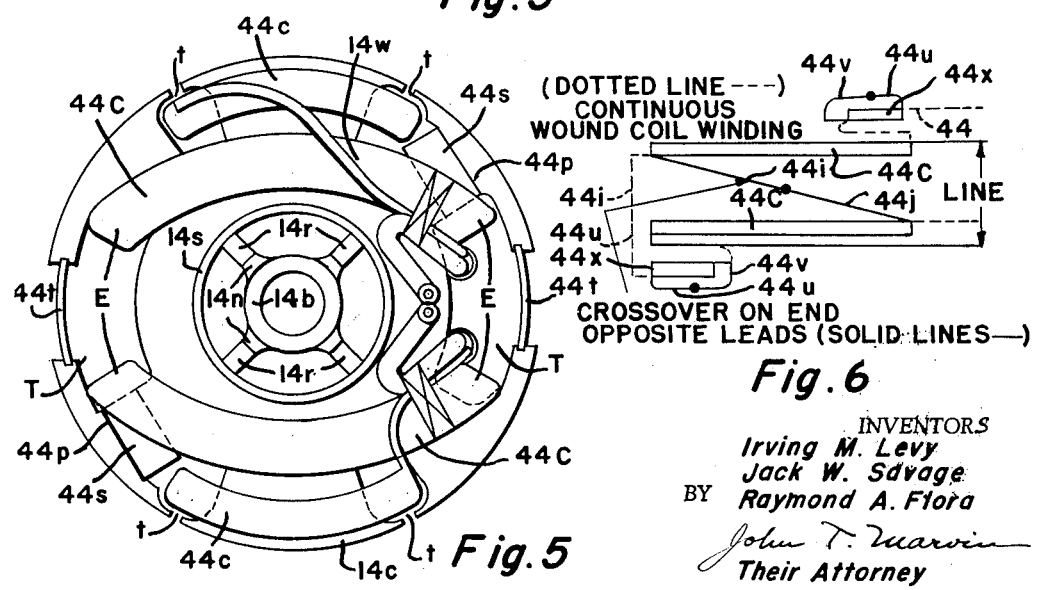

INVENTORS
Irving M. Levy
Jack W. Savage
BY  Raymond A. Flora

John T. Marvin
Their Attorney

United States Patent Office 2,990,112
Patented June 27, 1961

2,990,112
VENTILATING MEANS
Irving M. Levy, Jack W. Savage, and Raymond A. Flora, Dayton, Ohio, assignors to General Motors Corporation, Detroit, Mich., a corporation of Delaware
Filed May 28, 1959, Ser. No. 816,560
14 Claims. (Cl. 230—259)

This invention relates to a ventilating means and particularly, to a dynamoelectric machine having a rotor provided radially outwardly from a fixed centrally-located stator.

An object of this invention is to provide a new and improved ventilating means which is inexpensive to produce yet adaptable for powering multiple fan propeller blade means.

Another object of this invention is to provide a dynamoelectric machine structure including a stationary back plate which is adapted to be axially spaced and separated from a centrally located stator and external rotor relative to which there is an annular gap or space intermediate the back plate and rotor having fan blades carried radially outwardly of the gap for enhancing cooling of the dynamoelectric machine.

Another object of this invention is to provide an external dynamoelectric machine rotor having a radially outwardly extending revolving annular means or divider wall separating integral sets of fan blades on opposite sides thereof.

Another object of this invention is to provide a dynamoelectric machine having an external rotor including a radially outwardly extending wall means including integral fan blades extending axially relative to intermittent grooved sections formed in annular space between the fan blades on one side of the wall means, the intermittent grooved sections being adapted for mounting of balancing weights for simultaneously dynamically balancing both the rotor and fan blades.

Another object of this invention is to provide an inside-out motor including a back plate with an axially extending annular portion adapted to support a sleeve onto a periphery of which a stator is press-fitted and inside of which a space is provided for containing packing of lubricant-impregnated cellulose material located adjacent to a revolvable rotor shaft supported by bearing means having radial portions engaging the sleeve and adapted to carry cup members for retaining the lubricant-impregnated cellulose material.

A further object of this invention is to provide an inside-out motor including an external rotor having at least one set of fan blades thereon and having a shaft revolving relative to a centrally located stator as well as extending axially to provide a mounting for further fan means on the same shaft but separated from the first mentioned fan blades by a partition or wall means.

Another object of this invention is to provide an inside-out motor including a shaded pole winding carried by a stator that is press-fitted onto a unitary hub casting having a hollow interior and integral bearing means as well as a radially enlarged mounting portion.

Further objects and advantages of the present invention will be apparent from the following description, reference being had to the accompanying drawings wherein preferred embodiments of the present invention are clearly shown.

In the drawings:

FIGURE 2a is a fragmentary cross-sectional view of a modification of structure shown in FIGURE 2.

FIGURE 3 is a cross-sectional view of another embodiment of the present invention.

FIGURE 4 is a side view of windings carried by the stator of ventilating means in accordance with the present invention.

FIGURE 5 is a plan view of the stator taken in the direction of arrow 5 in FIGURE 4. FIGURE 6 is a schematic diagram of electrical connections for winding shown by FIGURES 4 and 5.

Figure 1:
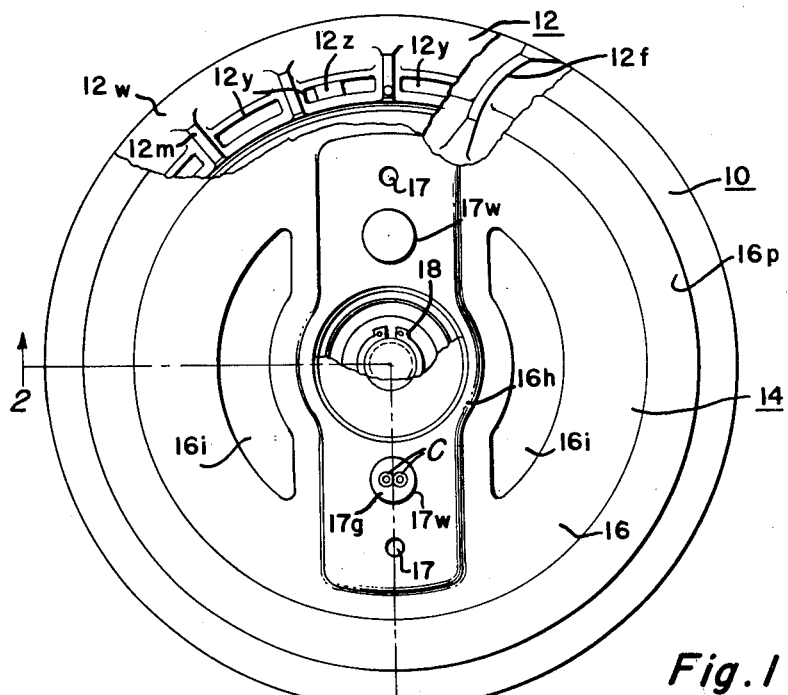
FIGURE 1 is a partially-sectioned end view of ventilating means in accordance with the present invention.

In FIGURE 1 there is a partially-sectioned end view of ventilating means generally indicated by numeral 10. The ventilating means includes an external rotor generally indicated by numeral 12 and a stator assembly generally indicated by numeral 14.

Figure 2:
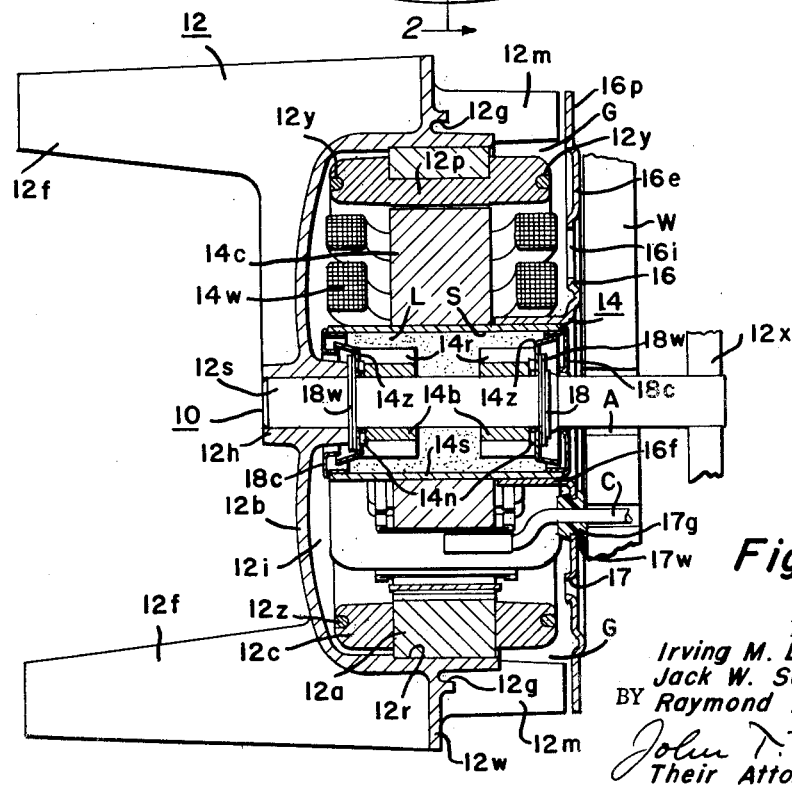
FIGURE 2 is a cross-sectional view taken along line 2—2 of FIGURE 1.

The external rotor means 12 comprises an assembly shown in greater detail in FIGURE 2. The rotor assembly preferably includes multiple fan blade means adapted to serve various functions simultaneously. One set of blades including fan members 12f is adapted to effect circulation of air within space such as in a room or inside an electrical appliance requiring dissipation of heat. The fan members 12f are cast integrally with a generally cup-shaped or annular body portion 12b of the external rotor as well as with a radially outwardly extending wall means, divider, partition or revolving air seal means 12w. The wall 12w and body portion 12b of the rotor are also integral with intermediate fan members 12m. Suitable fillets or contour portions are provided to join the fan members and wall 12w as well as the body portion 12b of the rotor. The intermediate fan members 12m are axially shorter than the fan blades 12f and the external diameter of the intermediate fan members 12m is also less than the overall diameter of both the divider wall 12w and fan blades 12f. The body portion 12b includes a hub 12h suitably secured to an end peripheral portion of a shaft 12s. The hub can be press-fitted onto the shaft 12s or well-known key means or even a pin could be used to secure the shaft and body portion to each other. Thus the shaft 12s is adapted to rotate together with the rotor at all times. The body portion 12b has a hollow interior 12i including a radially located recess portion 12r against the periphery of which a rotor lamination assembly 12a is press-fitted. The rotor lamination assembly 12a is formed of a plurality of slotted laminations stacked in alignment relative to each other and skewed if desired. A squirrel cage winding 12c is cast in a usual manner in a mold relative to the rotor lamination assembly 12a. The cast squirrel cage winding 12c includes conducting portions 12p extending through slots of the rotor lamination assembly and interconnected by end ring portions integral therewith on opposite sides of the rotor lamination assembly 12a. Each of the end ring portions is cast to include rotor balancing groove sections 12y into which balancing pieces or weights 12z can be pressed. In accordance with the present invention additional balancing grooves 12g are provided integral with the divider wall 12w along a radially inner end thereof immediately adjacent to the body portion 12b of the rotor. The grooves 12g are intermittently spaced and separated from each other by the short intermediate fan members 12m which extend axially relative to shaft 12s and laterally to one side of divider wall 12w. Balancing weights such as 12z can be pressed into these grooves 12g for dynamically balancing both the fan and rotor assembly simultaneously. A pre-balance can be established by pressing required weights 12z relative to the annular groove sections 12y after the rotor lamination assembly is cast integrally with the squirrel cage winding 12c. Then a final balance can be established by pressing similar weights 12z relative to the fractional annularly extending grooves 12g. It is also possible to omit the pre-balancing of the rotor lamination assembly per se and to perform dual dynamic balancing of the fan and rotor assembly simultaneously by pressing weights such as 12z only into appropriate locations in grooves 12g as required. The latter procedure is preferred in accordance with the present invention.

In the embodiment of the ventilating means or inside-out motor shown by FIGURE 1, shaft 12s extends axially on opposite sides of the rotor body portion 12b. An end of the shaft remote from the end onto which the body portion is press-fitted projects through a wall W having an aperture A. It is to be understood that the wall W provides a mounting for the ventilating means and a third fan means such as a slinger or propeller on a side of the wall W opposite to that on which the ventilating means for inside-out motor is secured. A fragment of this slinger or propeller 12x is shown in the view of FIGURE 2. The fan blade members 12f form what can be termed a Sirocco fan and the slinger or propeller 12x provides additional ventilation for another space requiring ventilation. For instance, the fan blade member 12f can be used to provide circulation of cooled air in an air conditioning apparatus while simultaneously the slinger or propeller fan can effect circulation of the fluid medium such as air relative to a condenser unit of an air conditioner. The slinger or propeller includes a plurality of radially outwardly extending blades which are interconnected relative to each other adjacent to an outer periphery thereof by means of an annular ring. The specific structure of the slinger or propeller depends upon the environment in which it is used and therefore only a fragment thereof is illustrated to emphasize that multi-purpose fan means are provided together with the rotor means 12 in accordance with the present invention.

Mounting of the inside-out motor in the embodiment of FIGURES 1 and 2 is established by means of an end plate or backing member 16 which is stationary and which is part of the stator generally indicated by numeral 14. The backing member is provided with at least a pair of apertures 17 through which suitable mounting bolts or fastening means can be fitted relative to wall W. The backing member 16 has an outer annular periphery 16p provided with an external diameter substantially equal to the external diameter of a free edge or radially outer portion of the intermediate blade members 12m. The backing member 16 also has an embossed portion 16e which is provided adjacent to and radially inwardly relative to the peripheral portion 16p. The embossed portion is adapted to abut against a surface on one side of wall W as shown in part by FIGURE 2. The embossed portion also increases rigidity and stability of backing member 16 that is also provided with a pair of air inlet openings 16i best visible in FIGURE 1. The inlet openings 16i are separated from each other by a central hub or apron portion 16h that is stamped to lie in the same plane as the peripheral portion 16p. The mounting apertures 17 and at least one opening 17w adjacent thereto is provided in this hub portion 16h. In FIGURE 1 a pair of the openings 17w are shown adjacent to the mounting apertures 17 and in FIGURES 1 and 2 there is shown a grommet 17g fitted against a periphery of the opening 17w so as to provide resilient support and insulation for several conductors C that pass through the grommet 17g. Integral with a radially inner end of the backing member is an annular, axially extending, flange portion 16f.

Figure 8:
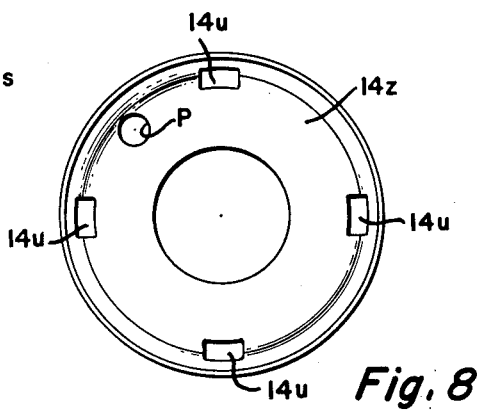
FIGURE 8 is an end view of the cup means for use in accordance with the present invention.

The stator also includes a hollow annular sleeve 14s onto a central outer periphery of which there is press-fitted a core 14c having slots adapted to carry stator windings 14w to be described in further detail below. One end of the sleeve 14s is press-fitted into engagement and in concentric relation to the flange portion 16f of the backing member 16. A pair of radially outwardly spoked bearing members 14b are press-fitted into engagement with an inner periphery 14s. The bearing members 14b are made in coaxial and concentric alignment relative to the sleeve 14s by means of the radially outwardly projecting legs or spokes 14r that are adapted to engage the inner peripheral surface of the sleeve 14s. The shaft 12s is rotatably supported relative to the bearing members 14b. Preferably the bearing members 14b are made of sintered metal or cast aluminum and each includes axially extending extrusions or nubs 14n which can be machined onto one side of the bearing members 14b or radial projections 14r such that a pair of cups shielding disks 14z can be attached to the bearing members 14b. A plan view of one of these cups or shielding disks is provided in FIGURE 8. Each cup or shielding disk includes a radially outer flange portion that extends axially or substantially axially relative to the shaft 12s adapted to pass through a central aperture. When a substantially X-shaped bearing member 14b is provided as shown in FIGURE 5 the cup or disk 14z is provided with 4 rectangular or square openings 14u through which the nubs 14n can be fitted and then swaged or peened over for fastening the cup 14z relative to its respective bearing member 14b. The cup as shown in FIGURE 8 is enlarged for purposes of clarity and also shows a passage P which can be closed with a suitable plug removable to permit access to space in between the bearing members 14b. Suitable washers or shims are provided on opposite external sides of the cup members 14z. The hub portion 12h of the rotor abuts against shims on one side of one cup member 14z and on a portion of a shaft 12s remote from the hub portion 12h there is an annular groove in the outer periphery of the shaft adapted to receive a snap-ring means 18 visible in both FIGURES 1 and 2. The shims or washers are identified by reference numeral 18w. Annular cover members 18c each having at least one axially extending flange portion press-fitted into engagement with an inner peripheral end of sleeve 14s are provided in substantially concentric and spaced relation to an outer annular periphery of the axial portion of each cup member 14z. The covers 18c, the cup members 14z, the sleeve 14s as well as bearings 14b and shaft 12s define a substantially annular or do-nut shaped space S adapted to be filled with a lubricant-impregnated material L. This lubricant-impregnated material can be a wicking of shredded or tufted fiber-like composition or it can be a cellulose material serving as a carrier or reservoir for lubricating fluid and commercially available under a tradename "Fluid Wick." The snap-ring 18 is adapted to provide a sole holding means to hold the rotor and stator together relative to each other. The lubricating material L is adapted to fill space S and the "Permawick" or fabric serves as a vehicle for oil or other lubricating media. The structure defining the space S is particularly well adapted for lubricating surfaces between the shaft 12s and bearings 14b because only the shaft 12s in this space is moveable and therefore the lubricant or oil remains in the material in space S because everything except the shaft 12s is entirely stationary. Space intermediate the legs or radial portions 14r of the bearing members 14b also serves as part of the cavity or reservoir for lubricant material.

As the rotor 12 turns relative to the stator 14, the multipurpose fan blade means are also rotated. The Sirocco blades 12f cause forced circulation of air as does the slinger or propeller. At the same time the intermediate blade members 12m effect turbulence in air occupying space in a toroid or do-nut shaped gap G located intermediate the peripheral portion 16p of the backing member 16 and an annular end of the body portion 12b of the rotor. Dust and foreign matter that can be agitated by the blade members 12f is hindered and/or prevented from moving rearwardly relative to the intermediate blade members 12m due to the provision of the divider wall or dust seal means 12w referred to earlier. Air from within the ventilating means including the external rotor and stator is forced to circulate from the inlet openings 16i into space surrounding the stator windings 14w and then radially outwardly through the gap G. Force of air circulating under pressure from the relatively small intermediate blade members 12m deflect foreign matter, dust and/or dirt for example from the gap G and also effects circulation of cooling air relative to the windings so that hot air does not become stagnant within the inside-out motor.

The body portion 12b of the rotor including the integral fan blade means 12f, 12m, and sealing divider wall 12w can be made of cast metal such as aluminum or of resin material. A suitable plastic resin would be phenolic or Bakelite which are commercially available. FIGURE 2a illustrates a fragment of a rotor in accordance with the present invention and made with such plastic or resin material. The body portion 12b of FIGURE 2 is made of cast aluminum and includes balancing groove sections 12g which are omitted in the embodiment of FIGURE 2a.

Another embodiment of ventilating means in accordance with the present invention is illustrated in FIGURE 3. The stator and rotor structure for the embodiment of FIGURE 3 is basically the same as that already described and therefore only differences in structure will be described in further detail. In the embodiment of FIGURE 3, the end plate or backing member is referred to by numeral 26 and includes holes for receiving fastening means. These holes 27 are provided relative to an embossed portion similar to that identified by numeral 16e, in FIGURE 2. However, the gap G is appreciably reduced in size because the backing member 26 is stamped out of sheet metal having a contoured portion 26p which is axially in alignment with a stamped sheet metal body portion 22b. Blades such as identified by reference numeral B are suitably attached to this sheet metal body portion 22b by use of fastening means such as rivets. The body portion 22b is secured to shaft 22s by press fitting annular periphery 22e as well as an inner end 22i of a hub means 22h into engagement with an outer periphery of the shaft at a predetermined spaced relationship to each other. Preferably the hub portion 22h is suitably attached such as by welding relative to the body portion 22b thus providing a rotor utilizing stamped sheet metal even for the hub adjacent to shaft 22s. The lubricating material referred to earlier is again provided in the space within a stationary sleeve which is press-fitted or welded relative to an inner flange portion of the backing member 26. Shrink fitting of the backing plate and sleeve relative to each other can also be used.

Figure 9A:
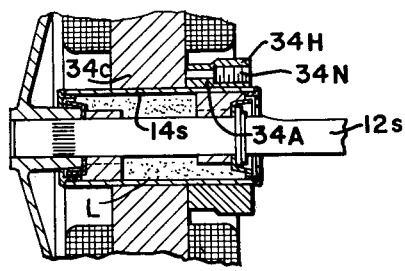
FIGURES 9 and 9a show modifications of hub structure in accordance with the present invention.
Figure 9:
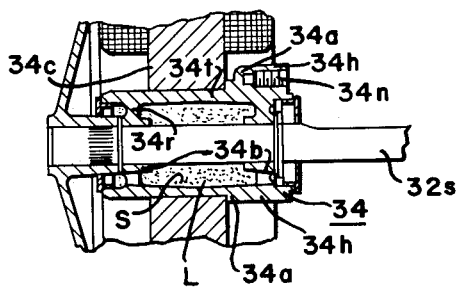

FIGURES 9 and 9a illustrate further embodiments of stator structure for use with the ventilating means in accordance with the present invention. In FIGURE 9 there is shown a solid tubular means generally identified by numeral 34 used in place of the sheet metal backing plate such as 16 and 26 referred to above. The member 34 has an integral tubular portion 34t adapted to provide a space S wherein the lubricant impregnated material is held relative to bearings 34b and shafts 32s. The member 34 includes an integral hub portion 34h provided with threaded openings 34n relative to which a fastening means can be fitted. An annular abutting portion 34a is provided along one side of the hub portion 34h and a plurality of stator laminations aligned relative to each other and referred to by numeral 34c can be press-fitted or force-fitted onto the outer periphery of the tubular portion 34t. The lamination core 34c abuts against the abutting portion 34a as shown in FIGURE 9. FIGURE 9a utilizes a cast, drawn and/or machined flange or hub portion 34H providing an abutting portion 34A and a mounting for the lamination core 34c is provided by use of a sleeve such as 14s which is force-fitted or press-fitted relative to the cast hub 34H. The shaft 12s is rotatably supported by bearings provided relative to the sleeve 14s as described before. The cast hub 34H has a threaded opening 34N relative to which mounting bolts can be fitted. In the embodiment shown by FIGURE 9, the bearing portions 34b are preferably also formed to be completely integral with the sleeve portion and hub portion. Thus the radially projecting portions 34r are also integral with the sleeve and bearings.

Electrical details of the ventilating means in accordance with the present invention are shown particularly in views of FIGURES 4, 5, 6, and 7. FIGURE 4 is a side view of windings carried by the stator and FIGURE 5 is a plan view of the stator and windings 14w. Preferably the inside-out motor having the revolving shaft 12s includes a squirrel cage winding for the rotor and a two pole concentric-coil winding for the stator. The stator windings 14w include a radially inner pair of coils 44C and a pair of radially outer coils 44c. Opposite ends E of the radially inner coils are placed into remote portions of a radially inwardly extending slot T on each of diametrically opposite sides of a stator lamination assembly 14c. Magnetic wedges 44t close off the base or open portion of each slot T. The radially outer coils of the concentric winding are fitted into two pairs of smaller slots t located along substantially equally spaced intervals intermediate the open ends of the larger slots T. Mounting of the stator assembly and windings relative to the hollow sleeve 14s is illustrated particularly in the views of FIGURES 4, 5 and 7. The sleeve 14s is located radially inwardly relative to the end turns of the inner and outer concentric windings provided relative to stator core 14c. A further innovation for ventilating means in accordance with the present invention is provided in the use of shading poles relative to a single phase concentrically wound two pole inside-out motor. Shading coils 44s formed of a closed strip of metal wrapped around a shading pole portion 44p of the stator core 14c can be best seen in FIGURES 5 and 7. The shading pole portion 44p is located intermediate the slots T and one pair of substantially diametrically opposite smaller slots t. A suitable insulation is provided relative to the radially inner and radially outer coils of the two pole stator winding. Slot insulation can also be provided as needed if necesary. The radially inner and outer coils 44C and 44c are connected in series relationed to each other. Preferably the radially inner and radially outer coils are continuously wound.

An optional winding arrangement for the ventilating means in accordance with the present invention is illustrated in FIGURE 6 wherein a two pole, shaded pole winding formed of continuous wound coils is illustrated. Dotted lines in the schematic diagram of FIGURE 6 outline the continuous-wound coil winding arrangement whereby only a pair of main radially inner coils 44c are adapted to be used with a lamination not provided with the smaller intermediate slots t. In place of metal shading coil strips 44s, there is provided a wound shading coil indicated by numeral 44x having leads 44u and 44v with free ends connected to each other for shorting purposes. Similarly lead ends 44i and 44j are connected to each other so as to provide series connections for the pair of wound main coils. Portions of the dotted lines are identified using reference numerals 44i, 44j, 44v, and 44u to illustrate how crossover connections on opposite end leads are established for forming the series connected main coils and shorted wound shading coils to be used on ventilating means in accordance with the present invention. Line voltage is supplied to the wound main coils as indicated in FIGURE 6 and it is to be understood that the length of wire left between the main and shading coils during winding is to be sufficient to permit leads as represented by the solid lines to be connected relative to each other. Preferably all lead connections are welded or soldered. Suitable slot insulators are provided and some end insulators can be provided on opposite sides of a stack of stator laminations. For example the main coil of the winding embodiment of FIGURE 6 includes 135 turns per coil and the shorting coil includes 35 turns per coil of suitable wire size such as number 19½. Hollow tube means or sleeve 14s provide support for the stator as described earlier. The concentric winding shown in FIGURES 4 and 5 provides an improved flux pattern relative to the two pole stator arrangement.

Figure 7:
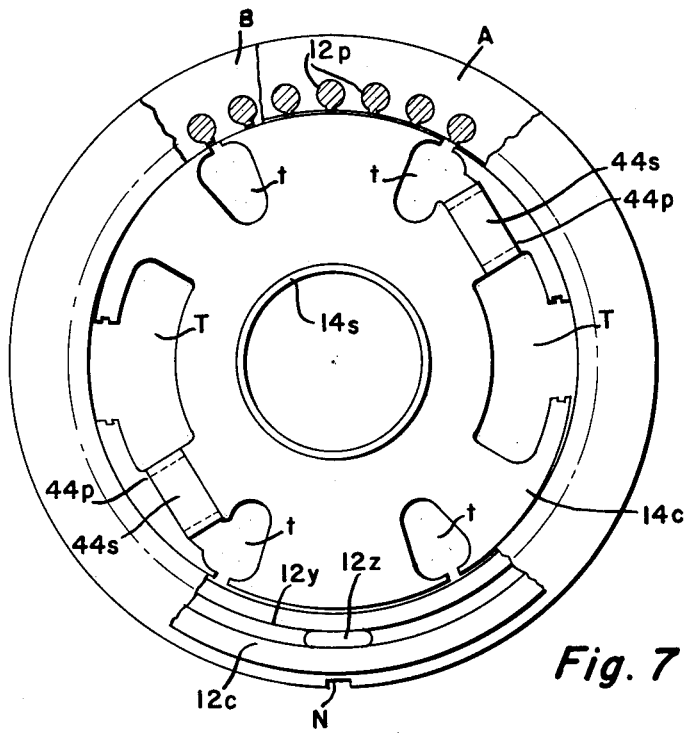
FIGURE 7 is a partially cross-sectioned view of the stator and rotor of ventilating means in accordance with the present invention.

The stator lamination per se can be best seen in FIGURE 7 which also illustrates the rotor lamination in a partially sectioned view. FIGURE 7 also illustrates a fragment of the cast squirrel cage winding of the rotor including the end ring having weights such as 12z fitted into a continuous or interrupted or annular groove 12y. These balancing weights and grooves were referred to in description with reference to FIGURES 1 and 2. FIGURE 2a illustrates a modified version of the rotor utilizing only balancing grooves for the squirrel cage winding of the rotor per se. Preferably the rotor and stator laminations are joined as a sub-assembly by means of a welding line which can be formed along a notch N for example, shown with the rotor in FIGURE 7. A portion of the rotor lamination B shown in FIGURE 7 illustrates the configuration of the slots along a radially inner periphery of the rotor laminations prior to machining. The slots are stamped into sheet metal so as to provide a skewed relation relative to the axis of sleeve 14s. Due to the fact that the slots are completely closed during casting of molten metal to form the squirrel cage winding, there is little if any difficulty in confining the molten metal relative to the rotor lamination slots. Another portion A of the rotor lamination illustrated in FIGURE 7 represents the rotor lamination assembly after machining of the inner periphery to effect opening of the inner ends of the slots and also to established necessary clearance or air gap between the rotor and stator adjacent to each other. Increase in radius along the inner periphery of the rotor as represented in FIGURE 7 after machining is exaggerated for clarity and actually is in the range of only .012 to .018 inches.

It is apparent that the ventilating means in accordance with the present invention provides an external rotating rotor as well as a rotating shaft together with a shielded enclosure. The concentric wound coils illustrated in FIGURES 4 and 5 provide improved air gap flux distribution.

While the embodiments of the present invention as herein disclosed constitute preferred forms it is to be understood that other forms might be adopted.

What is claimed is as follows:

1. Ventilating means, comprising, a stationary and hollow central annular support including at least a pair of bearing means therein spaced a predetermined distance from each other, a packing of lubricant-impregnated cellulose material contained immediately adjacent to said bearing means in space within said hollow support and directly in between said pair of bearing means, rotor means including a shaft rotatably journalled centrally and radially inwardly relative to said bearing means, stator means including a lamination assembly carried by said support, stator windings including main and shading coil elements fitted relative to slots of said lamination assembly, a squirrel cage winding carried by said rotor means in operative relation to said stator windings, and multiple fan blade means carried externally by said rotor means.

2. Ventilating means in accordance with claim 1 wherein said multiple fan blade means includes two sets of axially extending blades provided adjacent to said squirrel cage winding of said rotor means and a third fan attached to said shaft at a location remote from said two sets of blades.

3. Ventilating means in accordance with claim 1 wherein said multiple fan blade means includes a radially outwardly extending revolving air seal means separating integral sets of fan blades on opposite sides thereof.

4. Ventilating means, comprising, a stationary support including a hollow central annular sleeve portion and a peripheral portion adjacent to at least one axially extending ventilating opening, rotor means including a shaft rotatably journalled relative to said sleeve portion, a slotted stator lamination assembly carried by the sleeve portion of said support, a rotor body portion attached to one end of said shaft and extending radially outwardly as well as axially relative to said stator lamination assembly, stator winding means fitted relative to slots of said stator lamination assembly, rotor lamination and winding means carried axially relative to said rotor body portion, an annular radially-outwardly extending wall means integral with said rotor body portion, and separate sets of fan blades joined to said rotor body portion and wall means and extending in opposite directions axially on opposite sides of said wall means.

5. Ventilating means in accordance with claim 4 wherein said rotor body portion is axially spaced a predetermined distance from said peripheral portion of said stationary support so as to form a gap therebetween, said well means extending substantially in radial alignment with said stator and rotor lamination means, one set of said fan blades extending axially to a location radially outside the gap, said wall means and last-mentioned set of fan blades being adapted to hinder entry of foreign material such as dust through the gap through permitting ventilation radially outwardly through the gap from the axially extending ventilating opening relative to the stator winding means.

6. Ventilating means in accordance with claim 4 wherein said rotor body portion has a plurality of grooves provided along one side of wall means and separated by one set of fan blades, and weight means adapted to be fitted into the grooves whereby said rotor means can be dynamically balanced.

7. Ventilating means, comprising, a stationary support including a hollow central sleeve portion open at opposite ends, bearing means having a plurality of radially outwardly extending projections providing support and clearance for the bearing means relative to said sleeve portion, covering means for opposite ends of said sleeve portion, a lubricant impregnated packing material adapted to fill substantially the space between said covering means as well as between said radial projections and within said sleeve portion, rotor means including a shaft journalled for rotation in said bearing means, a body portion of said rotor means including integrally a radially outwardly extending annular divider wall and sets of fan blades provided on each of opposite sides of said divider wall, a rotor lamination assembly including a cast winding carried along an inner periphery of said body portion, and a stator lamination assembly including a shaded pole winding carried thereby in a location such that one set of fan blades is spaced radially outwardly thereof for effecting circulation of fluid medium to ventilate said shaded pole winding.

8. The ventilating means of claim 7 wherein said bearing means includes axially extending nubs adapted to be swaged for holding packing-retaining discs of said covering means.

9. The ventilating means of claim 7 wherein said shaded pole winding includes at least a pair of main coils continuously wound together with wound shading pole coils of which leads are cut and joined to form shorted shading pole coils and energizable main coils.

10. Ventilating means in accordance with claim 1 in which said blade means are attached peripherally along said rotor means and have a location radially in alignment with said stator means.

11. Ventilating means in accordance with claim 7 in which said divider wall is radially in alignment with said stator lamination assembly.

12. Ventilating means, comprising, a stationary and hollow annular sleeve-like support of sheet metal and a backing member of sheet metal that extends radially outwardly and is secured to one end of said sheet metal support, a pair of spider-like bearing means press-fitted to an inner periphery of said support in locations spaced axially a predetermined distance from each other within a cavity left between said support and bearing means therein, a packing of lubricant-impregnated cellulose material contained immediately adjacent to said bearing means in the cavity and directly adjacent to said pair of bearing means, rotor means including a shaft rotatably journalled centrally and radially inwardly relative to said axially spaced pair of bearing means, a cup-like body portion of sheet metal having a radially inner periphery and hub-like inner end axially spaced apart and press-fitted to one end of said shaft, stator means including a lamination assembly carried by said support, stator windings including main and shading coil elements fitted relative to slots of said lamination assembly, a squirrel cage winding carried by said rotor means in a location radially outwardly in alignment with said stator winding, and multiple fan blade means attached externally to said cup-like sheet metal body portion of said rotor means.

13. Ventilating means, comprising, a stationary and hollow annular sleeve-like support of sheet metal and a backing member of sheet metal that extends radially outwardly and is secured to one end of said sheet metal support, a pair of bearing means press-fitted to an inner periphery of said support in locations spaced axially a predetermined distance from each other within a cavity left between said support and bearing means therein, a packing of lubricant-impregnated cellulose material contained in the cavity immediately adjacent to said bearing means, rotor means including a shaft rotatably journalled centrally and radially inwardly relative to said bearing means, stator means including a lamination assembly carried by said support, stator windings including main and shading coil elements fitted relative to slots of said lamination assembly, a squirrel cage winding carried by said rotor means in operative relation to said stator windings, and a body portion of said rotor means formed of cast metal, plastic as well as resin material and the like having fan blade means formed integrally therewith in a location at least in part radially outwardly in alignment with said stator means.

14. The ventilating means of claim 13 wherein said rotor means has further impeller means such as an integral pulley, fan blades and the like provided thereon for rotation by said same shaft in addition to said fan blade means.

References Cited in the file of this patent

UNITED STATES PATENTS

| 2,768,583 | Richard et al. | Oct. 30, 1956 |
| 2,829,287 | Font | Apr. 1, 1958 |

FOREIGN PATENTS

| 739,414 | Great Britain | Oct. 26, 1955 |
| 894,414 | Germany | Oct. 21, 1953 |